United States Patent [19]

Tseng

[11] Patent Number: 4,457,650
[45] Date of Patent: Jul. 3, 1984

[54] REVERSIBLE WATERTIGHT TYPE CONTAINER SECURING ASSEMBLY

[76] Inventor: Tsiung-Siung Tseng, No. 707, 3-4-28, Sakurazaka, Chuo-Ku, Fukuoka City 810, Japan

[21] Appl. No.: 337,013

[22] Filed: Jan. 4, 1982

[51] Int. Cl.³ .......................... B60P 7/00; B61D 45/00
[52] U.S. Cl. .............................. 410/111; 24/265 CD; 24/597; 24/590; 410/112
[58] Field of Search ............ 24/68 CD, 201 C, 208 R, 24/219, 220, 221 R, 221 A, 265 AL, 265 CD, 265 EC; 410/52, 77, 80, 82–85, 90, 91, 94, 96, 101, 106–114, 116

[56] References Cited

U.S. PATENT DOCUMENTS

| | | | |
|---|---|---|---|
| 3,272,061 | 9/1966 | Seckerson | 24/221 R X |
| 3,298,652 | 1/1967 | Burdick | 410/107 |
| 3,381,925 | 5/1968 | Higuchi | 410/116 |
| 3,816,882 | 6/1974 | Maeda et al. | 24/221 R |
| 3,860,209 | 1/1975 | Strecker | 410/116 |
| 3,866,970 | 2/1975 | Schwiebert | 410/83 |
| 3,917,213 | 11/1975 | Poehlmann | 410/111 |
| 4,331,096 | 5/1982 | Lovejoy | 410/107 X |

Primary Examiner—Robert B. Reeves
Assistant Examiner—David F. Hubbuch
Attorney, Agent, or Firm—Austin R. Miller

[57] ABSTRACT

A securing assembly for marine use especially for securing container corners is provided which comprises, a support seat having a slot on a horizontal plane thereof; a reversible cover plate to be coupled with the support seat; a holding member, such as cone, twist lock, pad eye, cloverleaf cone, etc., mounted integrally on the cover plate, the holding member being protruded upward when used for securing cargo and kept under the cover plate into the slot of support seat when the cover plate is reversed downward. A T-bar is vertically penetrated through the cover plate and at one end thereof is a transverse handle key which exists at the opposite side relative to the holding members and on the other end of T-bar, there is a stopper piece. A notch or lug is provided at the lower end of the holding member, and a pair of wedge members is provided underneath the slot. The wedge members will be engaged with the notch, lug, or handle key for securing the cover plate with respect to the support seat. Watertight packing rings are fitted on the cover plate and support seat whenever necessary. Accordingly, when the holding member fitted upward on the deck, hatch cover, or tanktop of cargo hold, it can be used for securing cargos. When it is reversed downward into the slot and turned to a lock position, the cover plate can keep its top surface flush and same level to the surface of adjacent structures.

8 Claims, 42 Drawing Figures

FIG. 1A.
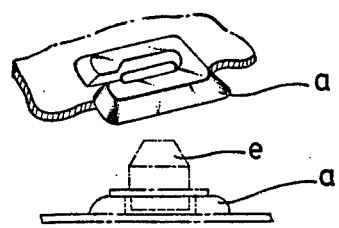
FIG. 1B
FIG. 1C.
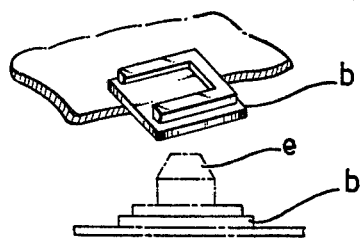
FIG. 1D.
FIG. 1E.
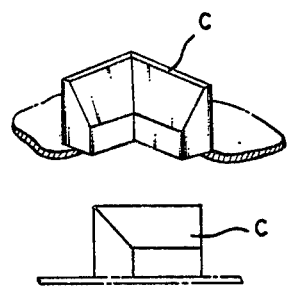
FIG. 1F.
FIG. 1G.
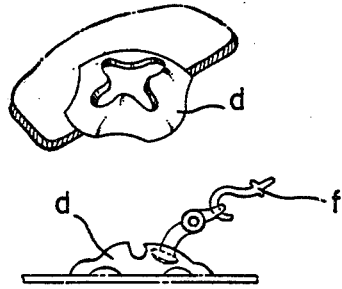
FIG. 1H.
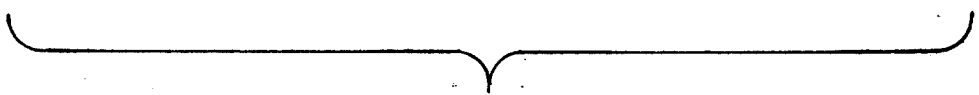
PRIOR ART FIG. 2A.
FIG. 2C.
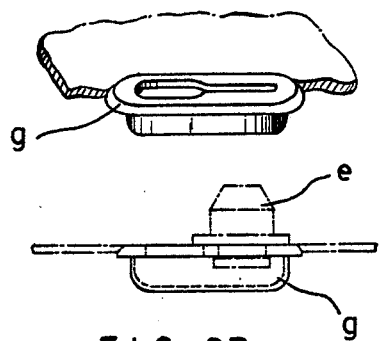
FIG. 2B.
FIG. 2D.
FIG. 2E.
FIG. 2G.
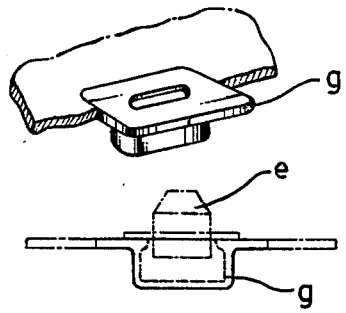
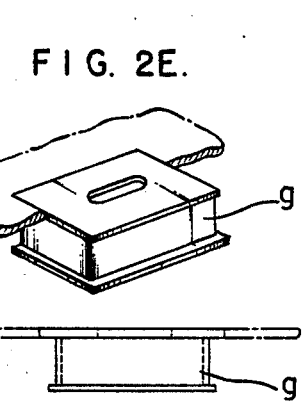
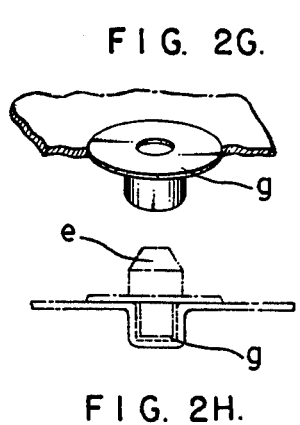
FIG. 2F.
FIG. 2H.
FIG. 2I.
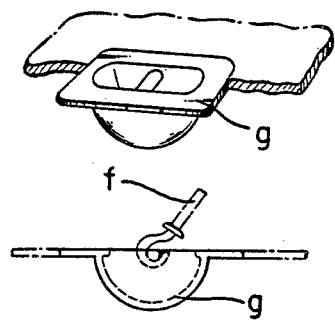
FIG. 2J.
PRIOR ART

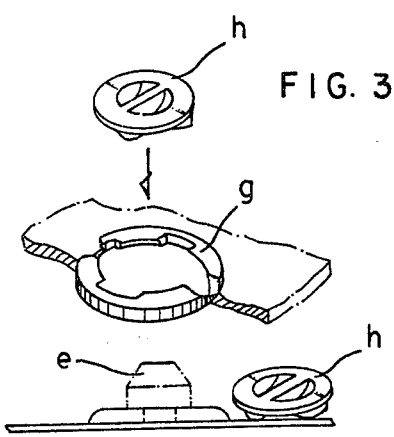
FIG. 3A.
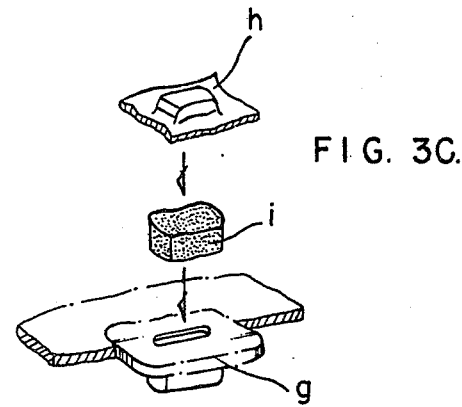
FIG. 3C.
FIG. 3B.
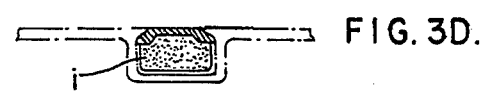
FIG. 3D.
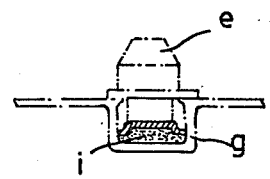
FIG. 3E.
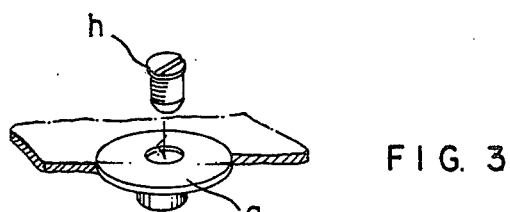
FIG. 3F.
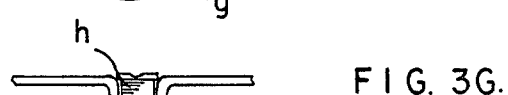
FIG. 3G.
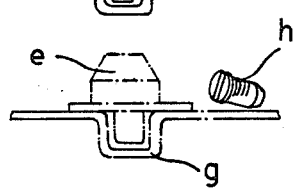
FIG. 3H.
PRIOR ART

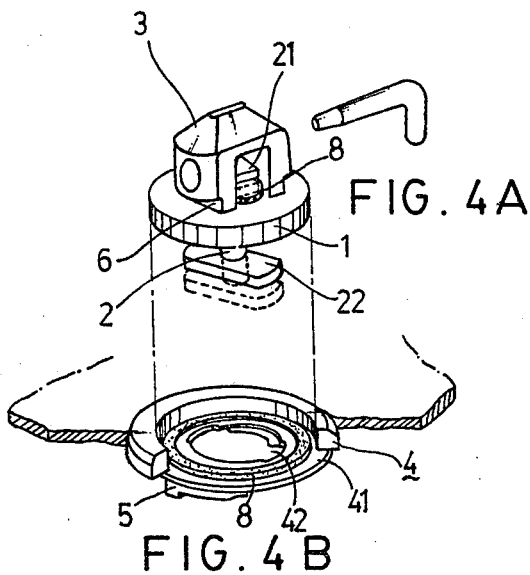
FIG. 4A
FIG. 4B
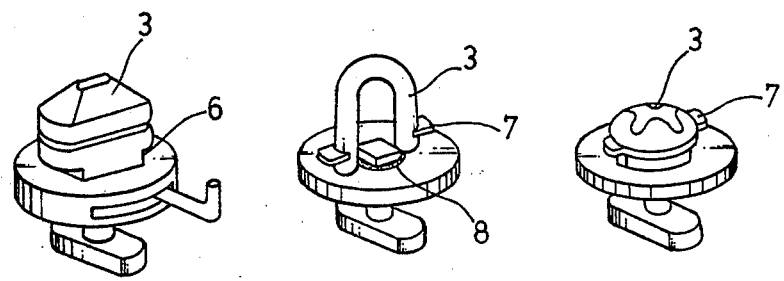
FIG. 4C  FIG. 4D  FIG. 4E
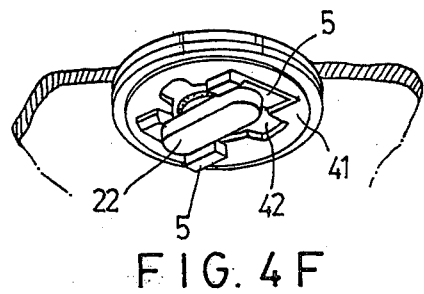
FIG. 4F

REVERSIBLE WATERTIGHT TYPE CONTAINER SECURING ASSEMBLY

BACKGROUND OF THE INVENTION

This invention relates to a securing assembly and particularly to a reversible and watertight type that can be disposed in either protruded position or levelled position on the load carrying space of cargo ships, such as, tanktop, cargo holds, deck, hatch cover, etc., for fixing large and heavy cargoes, such as, containers, plants, automobiles, etc.

In cargo ships, when carrying large, rigid cargoes it is usually necessary to protrude the securing assembly from the surface of the tanktop or other load carrying spaces for securing purpose. And when carrying bulk goods, such as grains, ores, coal etc., the securing assembly has to be removed therefrom to level the space thereof so that it will not be bumped by loading devices, such as, grabs, bulldozers, etc. The attaching and detaching of securing assemblies is an inconvenience present in the conventional securing assemblies.

Hereinunder there will be briefly described the conventional securing assemblies which have the above mentioned and other disadvantages.

FIGS. 1A through 1H shows protruded type securing assemblies which have a support seat of the forms, such as, slot plate a, slide guide b, corner bracket c, cloverleaf cone d, etc., to which a holding means e or f is removably attached, is welded on the tanktop or other load carrying spaces. The second type of securing assembly is a recess type, as shown in FIGS. 2A through 2J, in which a recess-shaped support seat g is welded on the load carrying places (cargo space) for supporting a holding means e or lashing means f.

In the protruded type, as the support seat is protruded above the adjacent surface, it may hinder loading or unloading bulk goods and also it may be often bumped by loading apparatus, such as grabs, bulldozers etc., and be damaged. Where the hatch cover is the foldable type, the protruded type securing assembly may cause difficulties in folding hatch covers. The protruded type securing assemblies must be removed when they are not used, resulting in storage and handling problems with these large quantities of assemblies and increases in labor and working time.

In the recess-type, some bulk cargoes may often be left in the recess thereof after they are unloaded. Besides, rain water and hold washing water may possibly enter into the recess, and get frozen therein under extreme cold weather. The frozen water causes the securing assembly to be difficult to attach thereto or detach therefrom. To prevent the entering of foreign matters or water, a method has been reluctantly utilized, as shown in FIGS. 3A through 3H, wherein the recess is covered up with a cap h or built up with elastic filling materials i. But this method incurs higher expenses as well as an inconvenient operation. In addition, the possible erosion-corrosion of the threaded portion of the caps h and the deformation of the filling materials are also disadvantages thereof. To overcome the above drawbacks, the inventor has improved a securing assembly which is reversible, self-stowing, watertight and dirt-free.

SUMMARY OF THE INVENTION

According to the invention, a securing assembly for securing cargoes on a cargo ship is provided comprising, a support seat having a slot on a horizontal plane thereof; a cover plate to be coupled with the support seat; a holding member mounted integrally on the cover plate, the holding member being protruded upward when in use and kept under the cover plate by inverting the cover plate and receiving the holding member in the slot when it is not used; and a locking means for securing the cover plate relative to the support seat.

In one embodiment of the invention, the locking means comprises a pair of wedge members coupled with the support seat; means provided in the holding member for engaging with the wedge members when the holding member is not used; a bar provided vertically through the cover plate and capable of moving upward and downward freely, a stopper block provided at an end of the bar on the same side as the holding member, a transverse handle key provided at the other end of the bar, the stopper block hindering the bar from rotating and the handle key entering the slot to be engaged with the wedge members when the holding member is protruded upward.

In another embodiment of the invention, the engaging means is a pair of notches or lugs provided on the holding member.

Preferably, the holding member can be in any form, such as stacker cone, twistlock cone, pad eye, cloverleaf cone, etc.

An object of the invention is to provide a securing assembly which can protrude when in use and can be inverted to level with the surface of adjacent structure.

Another object of the invention is to provide a securing assembly of self-stowing type to save labour.

A further object of the invention is to provide a securing assembly of watertight type to keep the recess of the support seat clean.

These and other objects, features and advantages of the present invention will be more apparent in the following description of a preferred embodiment with reference to the accompanying drawings, in which:

BRIEF DESCRIPTION OF THE DRAWINGS

FIGS. 1A, 1C, 1E and 1G are perspective views illustrating the prior art protruded type securing assemblies and FIGS. 1B, 1D, 1F and 1H are sectional views illustrating various forms of holding members in these prior art assemblies, respectively;

FIGS. 2A, 2C 2E, 2G and 2I are perspective views illustrating the prior art recess type securing assemblies and FIGS. 2B, 2D, 2F, 2H and 2J are sectional views illustrating various forms of holding members in these prior art assemblies, respectively;

FIGS. 3A, 3C and 3F are exploded perspective partially sectional views illustrating prior art securing assemblies which are provided with caps or filling materials for preventing the penetration of water or other foreign matters;

FIGS. 3D and 3G are sectional views of the assemblies shown in FIGS. 3C and 3F, respectively, and FIGS. 3B, 3E and 3H are sectional views of the prior art assemblies with holding means;

FIG. 4A is an exploded perspective view of a securing assembly with a holding member in the form of a stacker cone according to the invention;

FIG. 4B is a perspective view of a support seat according to the invention.

FIG. 4C is a perspective view of a cover plate mounted with a holding member in the form of a twistlock cone according to the invention;

FIG. 4D is a perspective view of a cover plate mounted with a holding member in the form of a pad eye according to the invention;

FIG. 4E is a perspective view of a cover plate mounted with a holding member in the form of a cloverleaf cone according to the invention;

FIG. 4F is an upward perspective view illustrating a handle key engaged and locked with a pair of wedge members in the support seat according to the invention;

BRIEF DESCRIPTION OF THE INVENTION

Figure 5A:
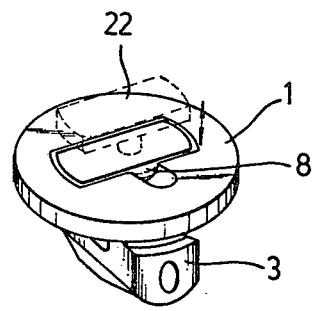
FIG. 5A is a perspective view of a securing assembly according to the invention with its handle key positioned upward.
Figure 5B:
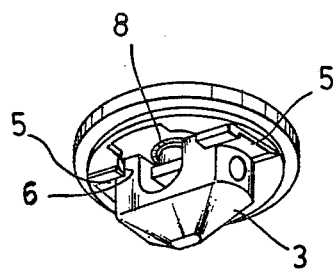
FIG. 5B is a perspective view of a securing assembly according to the invention with its holding member in the form of stacker cone reversed, kept under the cover plate and locked with wedge members.
Figure 5C:
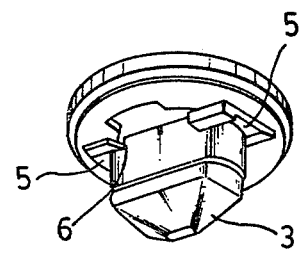
FIG. 5C is a perspective view of a securing assembly according to the invention with its holding member in the form of a twistlock cone reversed, kept under the cover plate and locked with wedge members.
Figure 5D:
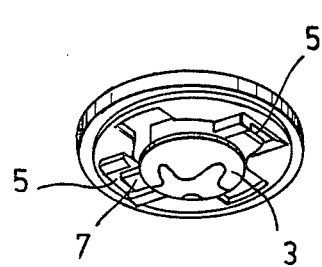
FIG. 5D is a perspective view of a securing assembly according to the invention with its holding member in the form of a cloverleaf cone reversed, kept under the cover plate, and locked with wedge members.
Figure 5E:
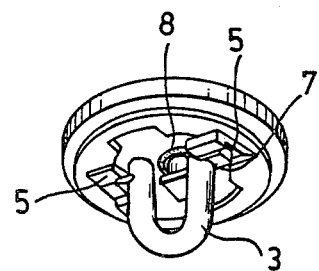
FIG. 5E is a perspective view of a securing assembly according to the invention with its holding member in the form of a pad eye reversed, kept under the cover plate, and locked with wedge members.

As shown in FIG. 4A, a securing assembly according to the invention comprises a disc-shaped cover plate 1; a T-shaped bar 2 which can move upward and downward penetrating through the plate 1 freely, a stopper block 21 at one end of the T-bar 2, a handle key 22 which will be used as a stopping member disposed at the other end of the T-bar 2. At the opposite side of the handle key 22 is a holding member 3 mounted on the cover plate 1. The holding member 3 can be of any forms, such as stacker cone, twistlock cone, pad eye, cloverleaf cone, etc., as shown in FIGS. 4A, 4C, 4D, 4F, and is provided with notches 6 or lugs 7. A support seat 4 to be coupled with the cover plate 1 has a plate 41 which has a slot 42 to receive the holding member 3 or handle key 22. As shown in FIG. 4F the plate 41 has two wedge members 5 to be engaged and locked tightly with the handle key 22 or any holding members 3 on their notches 6 or lugs 7 when turned to a certain designed angle, usually 90 degrees.

FIG. 5A shows the up and down motion of the handle key 22 when the holding member 3 is turned down into the recess in a stowage condition.

As shown in FIGS. 5B, 5C, 5D and 5E the notches 6 or lugs 7 of the holding members 3 are engaged and locked firmly with the wedge members 5 when the former are turned to a certain designed angle for securing the cover plates 1 with respect to the support seats 4 when the holding members 3 are kept in the stowage postion inside the recess.

Figure 6:
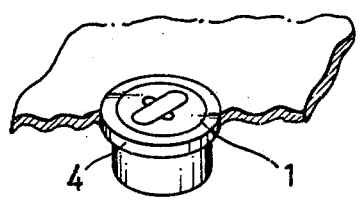
FIG. 6 is a perspective view of a securing assembly according to the invention in the position of being stowed flush to the adjacent surface, and ready for bulk cargo operation.

As shown in FIG. 6, the securing assembly is in a position level with and flush to the surface of the deck or other cargo spaces when it is not in use, wherein the holding member 3 thereof is stowed under the cover plate 1 inside the recess of support seat 4 so as to avoid being attacked and damaged by the grabs and/or bulldozers. To prevent water and other exterior matters penetrating into the slot 42 several packing rings 8 are provided at the contacts between the T-bar 2 and the upper side or lower side of the cover plate 1, and the contact between the cover plate 1 and support seat 4 wherever necessary.

Figure 7A:
FIG. 7A is a perspective view of a single body securing assembly as a fitting example of the invention.
Figure 7B:
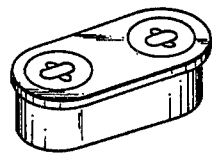
FIG. 7B is a perspective view of a double body securing assembly as a fitting example of the invention.
Figure 7C:
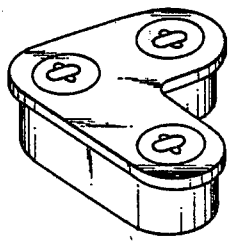
FIG. 7C is a perspective view of a triple body securing assembly as a fitting example of the invention.
Figure 7D:
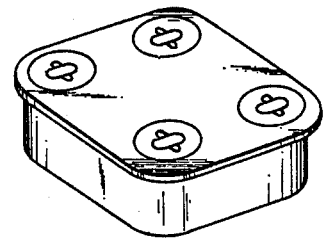
FIG. 7D is a perspective view of a quadruple body securing assembly as a fitting example of the invention.

If the T-bar 2 is made with a certain dimension and strength, the securing assembly can be used for upward lashing purpose. The securing assembly according to the invention can be constructed either into a single unit as shown in FIG. 7A or multi-units like a manifold box as shown in FIGS. 7B, 7C and 7D.

The hereinabove-mentioned securing assembly accordingly has the following advantages:

1. It can be kept watertight and dirt-free by preventing the penetration of water and or cargo sludges from getting into the recess box of the supporting seat.

2. It can be self-stowing to save a lot of time and labour of crews and or stevedores from shifting and transporting the securing fittings before use and after use.

3. It can allow grabs, bulldozers or vehicles to work and to pass freely on the tanktop in the cargo hold while the securing fittings are in stowage position and flush to deck surface.

4. It can bear upward lashing force.

With the invention thus explained, it is apparent that obvious modifications and variations can be made without departing from the scope of the invention. It is therefore intended that the invention be limited only as indicated in the appended claims.

What I claim is:

1. A securing assembly for securing cargoes on a cargo ship comprising:
   (1) a support seat having a slot on a horizontal plate thereof;
   (2) a cover plate to be coupled with said support seat, said cover plate being reversible;
   (3) a holding member integrally mounted on said cover plate, said holding member being protruded upward when in use and kept inside said slot after being turned downward to a storage position; and
   (4) locking means for securing said cover plate relative to said support seat when the assembly is either in use or in a storage position, said locking means comprising
      (i) a pair of wedge members coupled with said support seat underneath;
      (ii) engaging means provided in said holding member for engaging with said wedge members when said holding member is not in use;
      (iii) a bar provided vertically through said cover plate and capable of moving upward and downward freely;

(iv) a stopper block member provided at an end of said bar on the same side as said holding member for hindering said bar from rotating; and (v) a transverse handle key provided at the other end of said bar, said handle key entering said slot to be engaged with said wedge members when said holding member is protruded upward.

2. A securing assembly as claimed in claim 1, further comprising packings provided on said cover plate and said support seat to prevent water and other exterior matters penetrating into said slot.

3. A securing assembly as claimed in claim 1, wherein said engaging means is a pair of notches provided in said holding member.

4. A securing assembly as claimed in claim 1, wherein said engaging means is a pair of lugs provided on said holding member.

5. A securing assembly as claimed in claim 1, 3 or 4 wherein said holding member is in the form of a stacker cone.

6. A securing assembly as claimed in claim 1, 3 or 4, wherein said holding member is in the form of a twist-lock cone.

7. A securing assembly as claimed in claim 1, 3 or 4, wherein said holding member is in the form of a pad eye.

8. A securing assembly as claimed in claim 1, 3 or 4, wherein said holding member is in the form of a cloverleaf cone.

* * * * *